May 12, 1936.　　　F. L. BISHOP　　　2,040,238
MANUFACTURE OF LAMINATED GLASS
Filed Feb. 25, 1933　　　2 Sheets-Sheet 1

INVENTOR
Frederic L. Bishop
By Byrnes, Stebbins,
Parmelee & Blenko
Attorneys

May 12, 1936.  F. L. BISHOP  2,040,238
MANUFACTURE OF LAMINATED GLASS
Filed Feb. 25, 1933   2 Sheets-Sheet 2
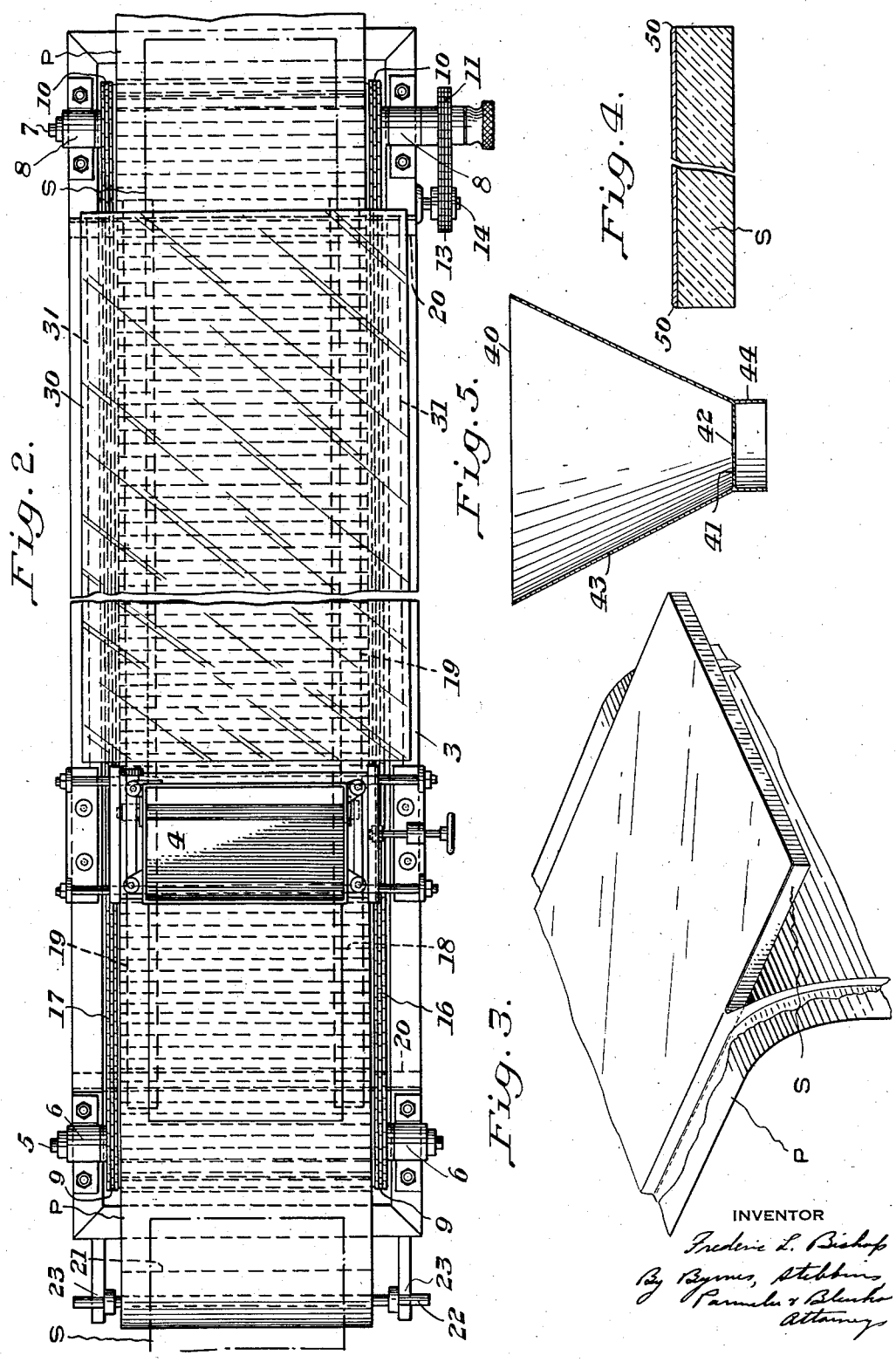
INVENTOR
Frederic L. Bishop
By Byrnes, Stebbins,
Parmelee & Blenko
Attorneys Patented May 12, 1936

2,040,238

UNITED STATES PATENT OFFICE 2,040,238

MANUFACTURE OF LAMINATED GLASS

Frederic L. Bishop, Fox Chapel Manor, Pa.

Application February 25, 1933, Serial No. 658,599

9 Claims. (Cl. 49—81)

My invention relates to the manufacture of laminated glass and provides a highly improved and efficient method of manufacture.

Heretofore, numerous methods or processes of manufacturing laminated glass have been practiced. In all of the successful methods of manufacturing laminated glass practiced heretofore, a sandwich of two sheets of glass and an interposed sheet of strengthening material has been formed. The strengthening material used in practically all instances where a successful product has been made, has been a cellulose composition material, such as cellulose nitrate or cellulose acetate. In carrying out the manufacture of a sheet of laminated glass comprising two sheets of glass and an interposed sheet of cellulose composition material, the sheets of glass and the sheet of cellulose composition material are cut to size, the glass sheets cleaned, and the sheet of cellulose composition material interposed therebetween and united thereto, either by the use of adhesives or by softening the interposed sheet so that it will adhere to the glass sheets.

In the copending application of Frederic L. Bishop and Charles S. Shoemaker, Serial No. 658,598, there is described a method of manufacturing laminated glass wherein a liquid strengthening material is flowed on one surface of at least one of two glass sheets, and the two glass sheets thereafter united with the layer of strengthening material therebetween.

In carrying out the process of manufacturing laminated glass wherein a liquid strengthening material is flowed on the glass sheets, difficulty was encountered in retaining the liquid strengthening material on the top surface of the glass sheets on which it was flowed. In order to obviate this difficulty of the liquid strengthening material flowing over the edges of the glass sheet on which it is flowed, the use of forms has been proposed. While the process of manufacturing laminated glass wherein a liquid strengthening material is flowed on the glass sheets may be successfully practiced where forms are used for the purpose of preventing the material from flowing over the edges of the glass sheets, it is highly desirable to dispense with the use of such forms.

Even where forms are used in order to retain a sufficient quantity of the liquid strengthening material on the glass sheets, the liquid strengthening material would flow over the edges of the glass sheets to a certain extent where the forms were not of the exact dimensions of the glass sheets to be coated. Under such circumstances, a uniform distribution of the strengthening material over the glass sheets could be obtained, but due to the fact that the material flowed over the edges of the glass sheets and was retained between the sheets and the forms, cleaning of the edges of the sheets was essential. This, of course, materially increases the cost of manufacture.

Even though the inside dimensions of the forms used coincided exactly with the dimensions of the glass sheets to be coated, some of the strengthening material would find its way over the edges of the glass sheets, and cleaning of the edges would be necessary.

While forms may be used satisfactorily on square or rectangular lights of glass, they cannot be satisfactorily used where lights of varying shapes and sizes are used. This is particularly true where one edge of the glass sheet is curved, which is the case with automobile windshields. As this is one of the large markets for laminated glass, it is most essential that a process be provided whereby the liquid strengthening material can be satisfactorily retained on the surface of the glass sheet, regardless of the shape thereof.

While, as stated above, forms may be satisfactorily used in many instances to retain the liquid strengthening material on the glass sheet and uniformly distribute it thereover, such forms cannot be satisfactorily used in commercial production. The use thereof would very materially increase the cost of production, in view of the fact that numerous forms of various sizes and shapes would be necessary and in view of the fact that considerable labor and time would be expended in the handling of the forms.

By my invention I provide a method of manufacturing laminated glass wherein a liquid strengthening material may be flowed on the glass sheets without the use of forms for retaining the liquid strengthening material on the glass sheets. I also provide a process wherein it is unnecessary to clean the edges of the glass sheets after the liquid strengthening material has been flowed thereon. Furthermore, even though I do not use forms of any character, the liquid strengthening material will be uniformly distributed over the glass sheets.

In accordance with my invention, I flow the liquid strengthening material on the glass sheets and control the flow characteristics of the strengthening material to cause it to cut off along the edges of the glass sheets.

In the accompanying drawings, I have shown for purposes of illustration only, apparatus which may be used in carrying out my improved process for the manufacture of laminated glass. It will be understood that I do not propose to be limited by the apparatus disclosed in the drawings, for, as will be pointed out hereinafter, the invention may be carried out on various types of apparatus.

In the drawings—

Figure 2 is a plan view of the apparatus shown in Figure 1;

Figure 3 is a diagrammatic perspective view of a sheet of glass as it leaves the discharge end of the apparatus shown in Figures 1 and 2;

Figure 4 is a sectional view of a sheet of glass coated in accordance with my invention; and Figure 5 is a sectional view of a funnel which may be used in determining the viscosity factor of the liquid strengthening material.

Figure 1:
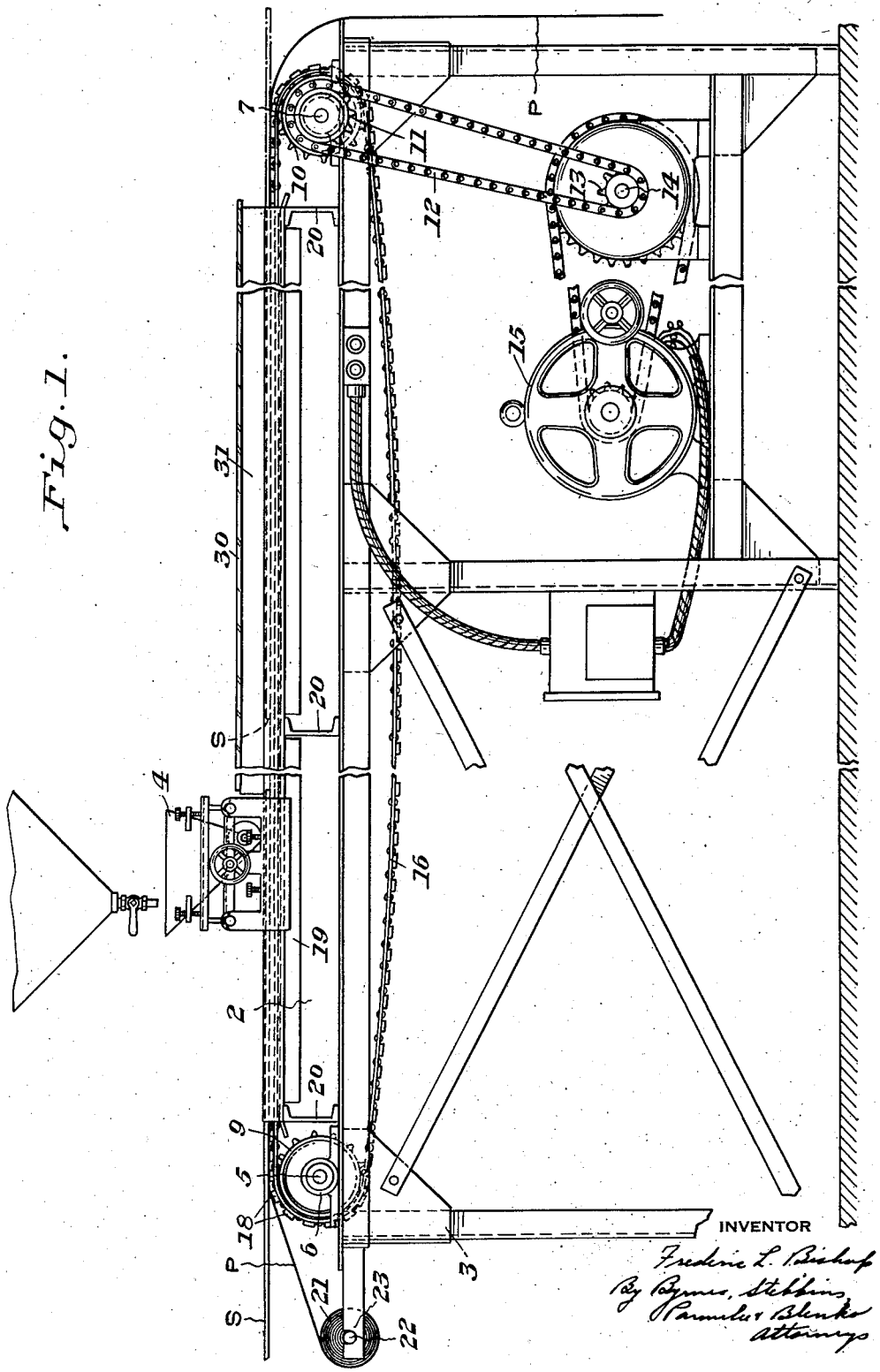
Figure 1 is a side elevational view of conveying and flowing apparatus which may be used in carrying out my invention.

In carrying out my improved process, the glass sheets to be coated are first either mechanically or chemically cleaned. Each glass sheet S to be coated is placed on a conveyor mechanism indicated generally by the reference character 2, which is mounted on a frame indicated generally by the reference character 3. The conveyor mechanism carries each glass sheet S past a flow machine indicated generally by the reference character 4, which is used for substantially uniformly flowing the strengthening material on each of the glass sheets.

The conveyor mechanism may be of any desired type or construction. As shown in the drawings, a cross shaft 5 is mounted in bearings 6 adjacent the end of the conveyor where the glass sheets are placed thereon. Adjacent the discharge end of the conveyor, a cross shaft 7 is mounted in bearings 8 mounted on the frame 3. The shaft 5 carries a sprocket wheel 9 adjacent each of its bearings. The cross shaft 7 carries similar sprocket wheels 10 adjacent each of its bearings. The shaft 7 adjacent the discharge end of the conveyor also carries a sprocket wheel 11 through which the shaft 7 is driven by means of a chain 12, which, in turn, is driven by a sprocket wheel 13 carried by a shaft 14. The shaft 14 is driven by a motor 15 through suitable connections.

The sprocket wheels 9 and 10 carry suitable continuous chains 16 and 17, the chains extending longitudinally of the conveyor and being located on each side thereof. The chains 16 and 17 carry transversely extending spaced slats 18, which are adapted to support the glass sheets on the conveyor. The slats 18 may be supported intermediate the ends by longitudinally extending T-shaped beams 19, which are supported on each end of the conveyor frame and in the center thereof by means of transversely extending channels 20.

A roll of paper 21, or other suitable material, is carried by a shaft 22 mounted in suitable bearings 23 adjacent the charging end of the conveyor. The paper P is placed over the conveyor slats beneath the glass sheets as they pass over, and will prevent the solution flowed on the glass sheets from getting on the conveyor mechanism.

It will be understood that the glass sheets may be laid directly on the paper P as they are carried by the conveyor past the flowing machine, or they may be spaced above the paper by means of suitable blocks. Various other methods of preventing the liquid strengthening material from getting on and contaminating the conveyor mechanism may be used. For instance, the conveyor slats on which the glass sheets are supported may be considerably shorter than the transverse dimensions of the glass sheets thereon, and a trough may be provided along each side of the conveyor mechanism and beneath the glass sheets for the purpose of catching and disposing of any surplus liquid strengthening material flowed either on the glass sheets or over the edges thereof. A glass cover 30 is mounted on supports 31 on either side of the conveyor frame for shielding the coating on the glass sheets against dust or any other impurities that may be in the air and which would stick to the newly formed coating. This glass cover is also for the purpose of providing a solvent-saturated chamber through which the glass sheets pass immediately after being coated. This will prevent the surface of the coating on the glass sheets from drying more quickly than desired.

The flow machine 4, as stated above, is used for uniformly flowing the strengthening material on the glass sheets as they pass therebelow. The flow machine is adapted to and will flow a layer of uniform thickness of the strengthening material on the glass sheets passing thereunder. The flow machine shown in the drawings is fully shown and described in the copending application of Frederic L. Bishop and Charles S. Shoemaker, Serial No. 658,598, and in the copending application of Frederic L. Bishop, Robert H. DuBois and Patrick Finegan, Serial No. 669,736. This flow machine forms no part of the present invention and will, therefore, not be specifically described herein. It will be understood that any type of flow machine may be used in the practice of my invention and, further, that my invention may be practiced when the material is flowed on the glass sheets in any manner whatever.

As the glass sheets are carried past the flow machine, they are coated with a layer of a solution comprising a liquid strengthening material. The apparatus shown in the drawings will flow a layer of uniform thickness on the glass sheets. The layer of liquid strengthening material may extend either to or beyond the edges of the glass sheets, and the advantages of my invention obtained by proper regulation of the flow characteristics of the solution containing the strengthening material.

After the glass sheets are coated, they are carried by the conveying mechanism beneath the glass plate 30 and are taken from the conveyor at the discharge end thereof.

It will be understood that after the coated sheets are removed from the conveyor mechanism, the coatings thereon are dried and a sandwich of either two coated sheets, or one coated sheet and another glass sheet, formed, and rigidly united together.

I have found that by controlling the flow characteristics of the solution of the strengthening material, it will cut off along the edges of the glass sheet and leave the edges thereof substantially clean and free of the strengthening material. Also, by so controlling the flow characteristics of the solution, the layer of liquid strengthening material flowed on the glass sheets may be caused to cut off along the edges thereof, and the solution prevented from flowing off the glass sheets.

The solution which I prefer to use in carrying out my invention is that described in the copending application of Frederic L. Bishop and Charles S. Shoemaker, Serial No. 658,598. This solution comprises a synthetic resin and a solvent therefor. The synthetic resin which I have found preferable is an ester of acrylic acid. Other ingredients, such as a plasticizing agent, may also be included in the solution.

The flow characteristics of the solution when applied to the glass sheets may be controlled or regulated by controlling the temperature of the solution itself, the temperature of the glass on which it is flowed, or both. I have found that best results can be obtained where the viscosity factor of the solution is from 80 to 110. Satisfactory results can be obtained where the solution has a viscosity factor different than the above, and I do not intend to be limited by these particular viscosity factors.

The above viscosity factors are not absolute viscosities but represent the number of seconds required for 200 c. c. of the solution at 75° F. to pass through a funnel, such as that shown in Figure 5. The funnel shown in Figure 5 has a top opening 40 which is 6.5 inches in diameter. The plate 41 in the lower part of the funnel has an orifice 42 which is .312 inches in diameter, through which the solution passes in the determination of the viscosity factor. The side wall 43 of the funnel is 4.75 inches in height. A circular plate 44 extends downwardly below the plate 41 a short distance.

A cutting off along the edges of the glass sheets may be obtained where the viscosity of the solution is not properly regulated to give the desired results. This cutting off along the edges may be obtained by passing the sheets of glass past the flow machine on the paper P, or other suitable material, and allowing the layer of strengthening material to either extend over or flow over the edges of the glass sheets. When each coated glass sheet reaches the discharge end of the conveyor mechanism, the paper may be removed from beneath the glass sheet by moving it in a vertically extending direction, as indicated in Figure 3 of the drawings. As the glass sheet continues in a horizontal direction and the paper is drawn from the bottom thereof in a vertically extending direction, the strengthening material which has flowed on the paper adheres closely thereto and pulls that portion of the strengthening material which has flowed over the edges of the glass sheet with it, causing a clean cutting off along the top edge of the glass sheet, as indicated in Figure 3.

Where the viscosity of the solution is properly controlled, the coating on the top of the glass sheet will be of uniform thickness and the edges thereof will be rounded slightly, as indicated at 50 (Figure 4).

It will be understood that after the glass sheets have been coated in the manner above described, the layer of strengthening material is permitted to dry, and that thereafter two glass sheets so coated are rigidly united together, or one of such coated glass sheets is rigidly united to a second uncoated glass sheet with the layer of strengthening material between the sheets.

As may be readily seen, my invention is a very material advance over the present practices wherein a sheet of strengthening material is placed between two glass sheets and the composite rigidly united together. Furthermore, as can be readily seen, it is a material advance over the methods of manufacturing laminated glass wherein a liquid strengthening material is flowed on the glass sheets and forms used for preventing the solution from flowing over the edges of the glass sheets.

While I have shown and described apparatus for carrying out my invention, and described the presently preferred practices, I do not propose to be limited thereby, as my invention may be otherwise practiced within the scope of the following claims.

I claim:

1. In the manufacture of laminated glass, the steps comprising flowing a liquid strengthening material on a glass sheet, controlling the viscosity of the liquid strengthening material to cause it to cut off along the edges of the glass sheet, and thereafter drying the coating.

2. In the manufacture of laminated glass, the steps comprising flowing a layer of a liquid strengthening material of substantially uniform thickness on a glass sheet, controlling the viscosity of the liquid strengthening material to cause it to cut off along the edges of the glass sheet, and thereafter drying the layer of strengthening material on the sheet.

3. In the manufacture of laminated glass, the steps comprising flowing a layer of liquid strengthening material on a glass sheet, controlling the flow characteristics of the layer of liquid strengthening material by controlling the temperature of the glass sheet to cause the layer of strengthening material to cut off along the edges of the glass sheet, and thereafter drying the layer of strengthening material on the sheet.

4. In the manufacture of laminated glass, the steps comprising flowing a layer of liquid strengthening material on a glass sheet, controlling the flow characteristics of the layer of liquid strengthening material by controlling the temperature of the liquid flowed on the sheet to cause it to cut off along the edges of the glass sheet, and thereafter drying the layer of strengthening material on the sheet.

5. In the manufacture of laminated glass, the steps comprising flowing a solution comprising a strengthening material and a solvent therefor on one side of a glass sheet controlling the flow characteristics of the solution by regulating the viscosity thereof to cause it to cut off along the edges of the glass sheet on which it is flowed, and thereafter drying the coating.

6. In the manufacture of laminated glass, the steps comprising flowing the solution comprising a strengthening material and a solvent therefor on one side of a glass sheet, controlling the flow characteristics of the solution as it is flowed on the glass sheet by controlling the relative temperatures of the solution and of the glass sheet to cause it to cut off along the edges of the glass sheet, and thereafter drying the coating.

7. In the manufacture of laminated glass, the steps comprising flowing a solution comprising a strengthening material, a solvent therefor, and a plasticizing agent on one side of a glass sheet, controlling the viscosity of the solution to cause it to cut off along the edges of the glass sheet and thereafter drying the coating.

8. In the manufacture of laminated glass, the steps comprising flowing a solution comprising a synthetic resin and a solvent therefor on one side of a glass sheet, controlling the viscosity of the solution to cause it to cut off along the edges of the glass sheet, and thereafter drying the coating.

9. In the manufacture of laminated glass, the steps comprising flowing a layer of a solution comprising a strengthening material and a solvent therefor on one side of a glass sheet, the viscosity factor of said solution being between 80 and 110, whereby the solution is caused to cut off along the edges of the glass sheet on which it is flowed, and thereafter drying the coating.

FREDERIC L. BISHOP.